United States Patent
Kaindl

(10) Patent No.: US 9,662,994 B2
(45) Date of Patent: May 30, 2017

(54) DEVICE FOR CHARGING AN ENERGY STORAGE UNIT OF ONE OR MORE ELECTRICALLY OPERATED VEHICLES

(71) Applicant: Bayerische Motoren Werke Aktiengesellschaft, Munich (DE)

(72) Inventor: Michael Kaindl, Ergoldsbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 285 days.

(21) Appl. No.: 14/485,111

(22) Filed: Sep. 12, 2014

(65) Prior Publication Data

US 2015/0028810 A1    Jan. 29, 2015

Related U.S. Application Data

(63) Continuation of application No. PCT/EP2013/054995, filed on Mar. 12, 2013.

(30) Foreign Application Priority Data

Mar. 13, 2012   (DE) .................. 10 2012 203 852

(51) Int. Cl.
- *H02J 7/00*    (2006.01)
- *B60L 11/18*   (2006.01)
- *H02J 13/00*   (2006.01)

(52) U.S. Cl.
CPC ....... *B60L 11/1824* (2013.01); *B60L 11/1816* (2013.01); *B60L 11/1846* (2013.01);
(Continued)

(58) Field of Classification Search
CPC ............. B60L 11/1816; B60L 11/1818; B60L 11/1824; B60L 11/1846; B60L 11/1861; B60L 11/1874; H02J 7/0004; H02J 13/002
(Continued)

(56) References Cited

U.S. PATENT DOCUMENTS

2002/0063474 A1* 5/2002 Wasaki ............... H04B 3/56
                                                      307/89
2007/0202823 A1* 8/2007 Marsh ................ H04B 1/1018
                                                     455/223
(Continued)

FOREIGN PATENT DOCUMENTS

DE   10 2009 025 302 A1   12/2010
DE   WO 2011006775 A2 *    1/2011   .......... B60L 11/1818
(Continued)

OTHER PUBLICATIONS

International Search Report (PCT/ISA/210) dated Jan. 8, 2014 with English translation (seven pages).
(Continued)

Primary Examiner — Richard Isla Rodas
Assistant Examiner — David V Henze-Gongola
(74) Attorney, Agent, or Firm — Crowell & Moring LLP

(57) ABSTRACT

An apparatus is provided for charging an energy storage unit of one or more electrically operated vehicles. The apparatus has at least two charging connections. Each of the charging connections has a communication port for exchanging data with the vehicle connected to the charging connection. The communication port of each of the charging connections is coupled to an assigned first communication device, which is designed for communicating with a corresponding first communication device of the vehicle connected to the relevant charging connections, based on a pulse-width modulated signal transmission. A second communication device is coupled via a coupling point to communication ports of all charging connections to communicate with a corresponding second communication device of a vehicle, based on digital data transmission. A compensation unit is wired in between the coupling point and the first communication devices, which is designed to generate a counter-phase signal to a signal that is transmitted from a transmit-
(Continued)

ting first communication device to the assigned communication port and to apply it to the coupling point.

15 Claims, 6 Drawing Sheets

(52) U.S. Cl.
CPC ....... *B60L 11/1861* (2013.01); *B60L 11/1874* (2013.01); *H02J 7/0004* (2013.01); *H02J 13/002* (2013.01); *Y02T 10/7005* (2013.01); *Y02T 10/705* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 30/12* (2013.01); *Y04S 30/14* (2013.01)

(58) Field of Classification Search
USPC ......................................................... 320/109
See application file for complete search history.

(56) References Cited

U.S. PATENT DOCUMENTS

| 2012/0112697 A1* | 5/2012 | Heuer | ................ | B60L 11/1818 320/109 |
| 2012/0213531 A1* | 8/2012 | Nazarathy | ............. | H03M 1/145 398/202 |

FOREIGN PATENT DOCUMENTS

| DE | 10 2010 011 162 A1 | 2/2011 | | |
| DE | 10 2009 056 395 A1 | 5/2011 | | |
| EP | 2 048 762 A1 | 4/2009 | | |
| EP | 2 426 004 A2 | 3/2012 | | |
| JP | 2048762 A1 * | 4/2009 | ............ | B60L 11/123 |
| WO | WO 96/01518 A1 | 1/1996 | | |
| WO | WO 96/32768 A1 | 10/1996 | | |

OTHER PUBLICATIONS

German Search Report dated Nov. 2, 2012 with partial English translation (10 pages).
Albers "Intelligentes Laden mit Microsar IP ermöglicht flexible Ladevorgänge und einfache Bezahlung" Komfortables Laden, Jul. 2011, pp. 60-63, Elektronik automotive Sonderausgabe Elektromobilität 2011.

* cited by examiner

DEVICE FOR CHARGING AN ENERGY STORAGE UNIT OF ONE OR MORE ELECTRICALLY OPERATED VEHICLES

CROSS REFERENCE TO RELATED APPLICATIONS

This application is a continuation of PCT International Application No. PCT/EP2013/054995, filed Mar. 12, 2013, which claims priority under 35 U.S.C. §119 from German Patent Application No. 10 2012 203 852.3, filed Mar. 13, 2012, the entire disclosures of which are herein expressly incorporated by reference.

BACKGROUND AND SUMMARY OF THE INVENTION

The invention relates to an apparatus for charging an energy storage unit of one or more electrically operated vehicles. To do so, the apparatus comprises at least two charging connections, wherein each of the charging connections includes a communication port for exchanging data with the vehicle connected to the charging connection.

For charging an energy storage unit of an electrically operated vehicle, a communication exchange between the vehicle and the charging apparatus is required. Within the scope of such communications, information is exchanged, for example, regarding the charge readiness of the charging apparatus, a given line connection between the vehicle and the charging apparatus, any required cooling during the charging process as well as any occurring errors. Via a so-called "duty cycle" of an oscillator, information can also be exchanged about the level of the charging current required or the maximum charging current that can be provided by the charging apparatus. Typically, the communication takes place via a pulse width modulated signal. To this end, the charging station and the vehicle have corresponding communication units.

In the case of a charging apparatus that allows for the simultaneous charging of multiple electrically operated vehicles, the aforementioned communication device must be provided for each charging connection at which a vehicle can be charged. A vehicle connected to a particular charging connection always communicates here with a communication device assigned to this charging connection.

A disadvantage of communication that is based on a pulse width modulated signal transmission is that only few specified pieces of information between the charging apparatus and the vehicles can be exchanged. This is to be remedied by digital communications, which can be based according to ISO 15188 on power-line technology. A single communication device in the charging apparatus can then communicate specifically with corresponding communication devices of a plurality of vehicles.

Since on the charging apparatuses, there will be charged both vehicles that only have a pulse width modulation-based communication device as well as those vehicles with a power-line communications-based communication device, both communication devices must be provided in the charging apparatus. The problem hereby is that pulse width modulated signals can be coupled into other communication paths via a coupling circuit of a power-line modem. Such a coupling could result in interference or malfunctions in the charging apparatus.

The object of the present invention is to provide an apparatus for charging an energy storage unit, which is structurally and/or functionally improved.

This task is solved by an apparatus according to the invention for charging an energy storage unit of one or more electrically operated vehicles. The apparatus comprises at least two charging connections. Each of the charging connections includes a communication port for exchanging data with the vehicle connected to the relevant charging connection. In addition, each of the charging connections has a power connection, by which energy from an energy network can be transmitted to the energy storage unit of the relevant vehicle.

The communication port of each of the charging connections is coupled to an assigned first communication device, which based on a pulse width modulated signal transmission is designed to communicate with a corresponding first communication device of the vehicle connected to the relevant charging connection.

Furthermore, the apparatus includes a second communication device, which is coupled via a coupling point to the communication ports of all charging connections, to communicate, based on a digital data transmission, with a corresponding second communication device of a vehicle. Because of the digital data transmission method, it is sufficient to provide only one second communication device in the apparatus. Communication with a certain charging connection and an electric vehicle coupled to it can be ensured, for example, by way of a data transmission protocol.

Lastly, the apparatus includes a compensation unit that is wired in between the coupling point and the first communication devices. The compensation unit is designed to generate a counter-phase signal to a signal that is transmitted from a transmitting first communication device to the assigned communication port or vice versa, and to apply it to the coupling point.

The compensation unit ensures that feedback from signals transmitted by the first communication device cannot adversely interfere with the second communication device. Also, the compensation unit ensures that communications between a first communication device and an assigned first communication device of a vehicle connected to a charging connection cannot be transmitted on the communication paths of the other communication ports.

The invention is based on the idea that the second communication device is coupled via a coupling network to the respective communication ports of the charging connections. In a manner known to a person skilled in the art, the coupling network comprises for every communications path at least one capacitor that connects the coupling point to the relevant communications connection of a communications path. Via this coupling, the pulse width modulated signals of a transmitting first communication device can also spread out into the lines of the communication paths to which the other first communication devices are connected. Also, the second communication device can, based on its direct coupling to the coupling point, receive the corresponding pulse-width modulated signals.

Filtering that is in principle possible has the disadvantage that a filter can always only suppress certain frequencies or frequency bands. However, a signal (generally a square-wave signal) generated by pulse width modulation (PWM) contains very many harmonic waves such that the filter would have to function in a very broad-band manner. In addition, the filter would have to be very powerful in all frequency ranges.

Due to the compensation unit, which directs a counter-phase signal of every single PWM generator of a first communication device to the coupling point, the coupling point always remains neutral. Interference can thereby not spread out. The result is broadband interference suppression.

It is thereby possible without influencing to operate multiple first communication devices with a single second communication device at the same communication ports of the charging connections. The resulting advantage is that regardless of the communications technology used, charging stations can be used universally both for vehicles with a first or a second communication device. A corresponding charging apparatus can thus be provided in a cost-effective manner.

To generate a counter-phase signal, the compensation unit comprises preferably at least a first function unit for phase-shifting the signal sent out by the transmitting first communication device in operation. Such a first function unit can, for example, be realized by a power driver, as it is used in a first communication device. By being correspondingly wired in with a signal-generating unit of the first communication device, a phase shift can be effected.

In another practical design, the compensation unit comprises at least a second function unit, which replicates the electric behavior of the corresponding first communication device of the vehicle, which is connected to the charging connection, whose assigned first communication device generates the signal. The counter-phase signal can be reproduced more precisely to the signal generated by the first communication device and applied to the coupling point.

It is also purposeful if a switching element of the second function unit in operation is actuated in such a manner that its switching state corresponds to the switching state of the corresponding switching element of the corresponding first communication device. The communications behavior of the corresponding first communication device of the vehicle is hereby reproduced. Since the electrical behavior is changed by the function of the corresponding first communication device, this is also made perceivable in a change of the signal at the coupling point. To also compensate for this change, actuation of the second function unit in operation is provided.

In particular, the second function unit, particularly the switching element of the second function unit, can hereby be controllable by a controller, wherein the controller serves to control a selection switch of the charging connection and/or the first communication device. An alternative consists of making the second function unit controllable, particularly the switching element of the second function unit, depending on a signal level detected in the transmitting communication device.

In particular, it may be provided that the second function unit is coupled for detecting the signal level of a power driver, constructed in particular as a push-pull amplifier, of the first communication device.

In another advantageous embodiment, the communications unit comprises at least a third function unit, which represents the electrical behavior of a line that connects the vehicle to the charge connector during a charging procedure. The real load of the coupling point is also hereby taken into account by the cable. In the third function unit, the cable is reproduced by concentrated, discrete elements.

Furthermore, it is advantageous if a first, a second and/or a third function unit is assigned to each of the first communication devices. In other words, this means that the compensation unit comprises a number of compensation devices corresponding to the number of charging connections, wherein each of the compensation devices preferably comprises a first, a second, and a third function unit of the type described above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
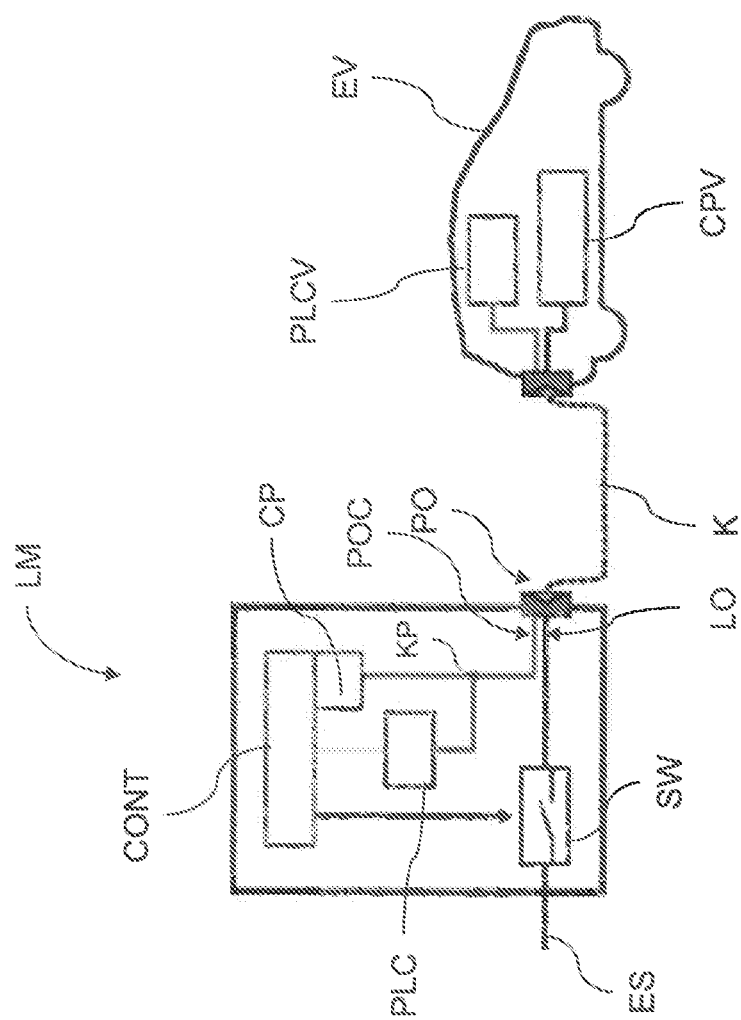
FIG. 1 a schematic illustration of a charging apparatus, at which an electrically operated vehicle can be charged.

FIG. 1 depicts in a schematic illustration a charging apparatus LM for charging an energy storage unit of an electrically operated vehicle EV. To charge the energy storage unit (not shown) of vehicle EV, the latter is connected via a cable to a charging connection PO of charging apparatus LM. Charging connection PO includes a communication port POC for exchanging data with vehicle EV connected to charging connection PO. In addition, charging connection PO includes a power connection LO for transmitting electrical energy into the energy storage unit of vehicle EV.

Charging apparatus LM includes a controller CONT, which is coupled to a first communication device CP and a second communication device PLC for controlling or monitoring them. In addition, controller CONT controls a charging switching element SW, which in a closed state connects a line ES of an energy source to the power connection of charging connection PO.

First communication device CP serves to communicate with a corresponding first communication device CPV of vehicle EV. The communication between communication devices CP, CPV is based on signals, which are pulse width modulated. First communication device CP of charging apparatus LM and the corresponding first communication device CPV of vehicle EV can, for example, be standardized according to IEC 61851 or SAE 17772. Within the scope of a communication regarding the first communication device CP or CPV, only a few pieces of information can be transmitted.

A first piece of information consists of signaling that a vehicle EV is connected to charging connection PO. A readiness for charging can be signaled from the vehicle EV. Also, the vehicle can signal whether cooling is required during the charging process. Lastly, there is the possibility of signaling an error. Information about the charging current required by the energy storage unit or about a charging current that can be provided by charging apparatus LM may be transmitted via a so-called "duty cycle" of the pulse width modulated signal.

However, if vehicle EV has, besides the corresponding first communication device CPV, a second communication device PLCV which is designed corresponding to the second communication device PLC of charging apparatus LM, in principle the transmission of any information is possible based on digital data transmission. Communication can then be based on power-line technology according to ISO 15188.

The first and second communication devices CP, PLC of charging apparatus LM are coupled to one another at a coupling point KP. Coupling point KP is connected to communication port POC of charging connection PO. A corresponding arrangement is located on the vehicle EV side.

Figure 2:
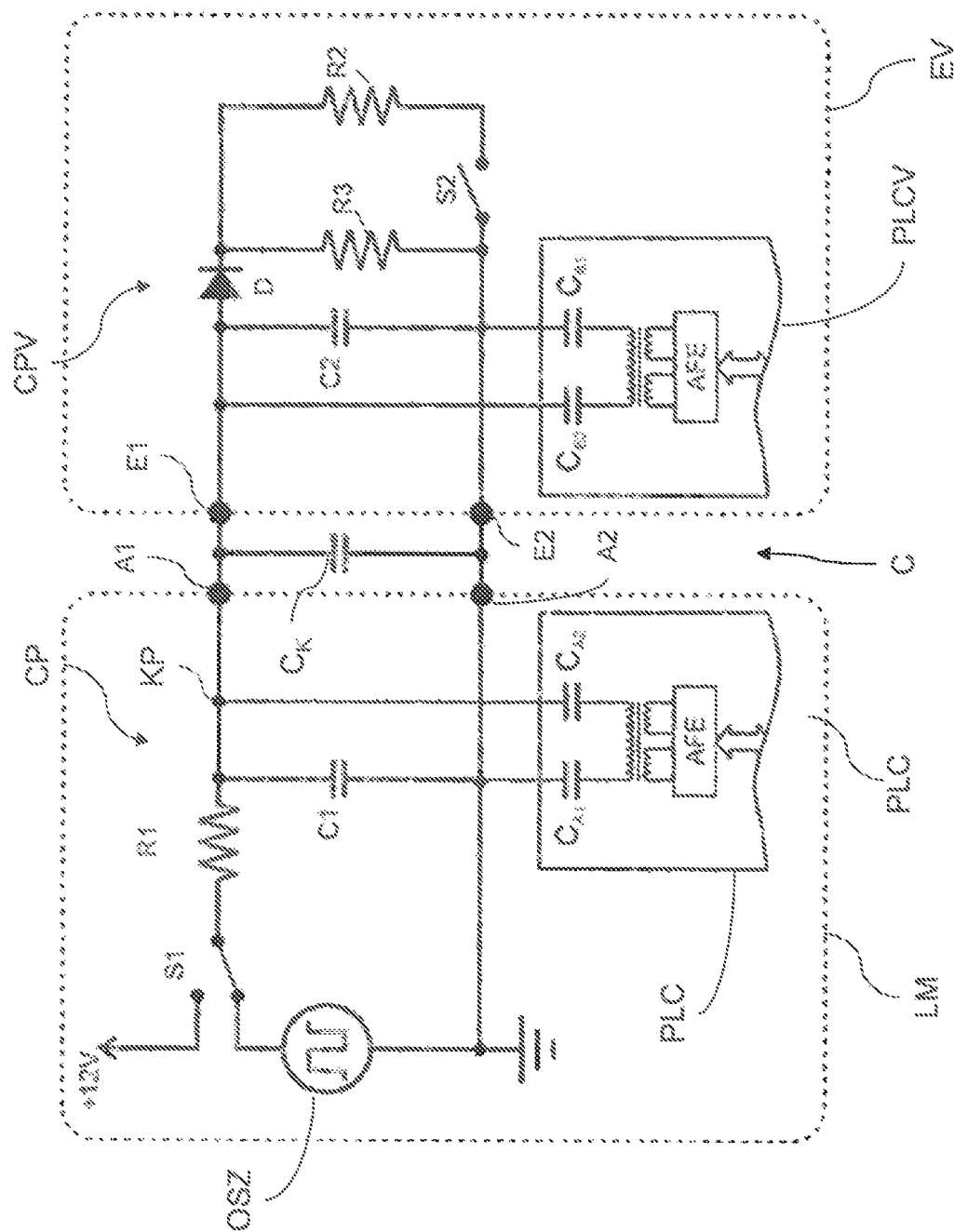
FIG. 2 is a basic circuit diagram, which comprises a first and a second communication device in the charging apparatus and in the vehicle for optional communications.

FIG. 2 depicts a basic circuit of the electrical equivalent circuit diagram of the arrangement from FIG. 1. In doing so, in particular, only the components required for communication between charging apparatus LM and vehicle EV are shown. First communication device CP of charging apparatus LM includes an oscillator OSZ that is switched between a switching element S1 and a reference potential. Switching element S1, which is designed as a toggle switch, can be switched over between oscillator OSZ and a fixed supply voltage, according to a standard set to +12V. The duty cycle already mentioned above of a pulse width modulated signal can be adjusted via oscillator OSZ. Switching element S1 is switched in series with a resistor R1. Parallel to the series circuit of resistor R1, switching element S1 and oscillator OSZ, there is switched a capacitor C1, which is provided for reasons pertaining to electromagnetic compatibility (EMC). Capacitor C1 is connected to outputs A1, A2 of communication port POC. The second communication device PLC is also connected to these. The components required for the second communication device PLC are only depicted schematically in the form of a modem and are sufficiently known to a person skilled in the art, so that these are not described in further detail.

$C_K$ designates a cable capacity representing cable K, which is electrically effective between outputs A1, A2. Outputs A1, A2 of communication port POC are connected to inputs E1, E2 of vehicle EV. The corresponding first communication device CPV includes a capacitor C2, which is connected to inputs E1, E2. Capacitor C2 is provided for reasons pertaining to EMC. Parallel to capacitor C2, there is wired in a series circuit consisting of a diode D and a resistance network. The resistance network comprises a resistor R3, which is switched in parallel to a series circuit consisting of a resistor R2 and a switching element S2. Furthermore, the corresponding second communication device PLCV is interconnected with inputs E1, E2.

Depicted only schematically, the modems of the second communication device PLCV are able to transmit data at up to 10 megabits/second, for example.

A communication from vehicle EV to charging apparatus LM occurs by actuating switching element S2. A controller required to do so is not depicted in FIG. 2. For example, the closing of switching element 2 signals that charging of the energy storage unit of vehicle EV is to take place.

A communication from charging apparatus LM toward vehicle EV occurs through the duty cycle of oscillator OSZ, wherein switching element S1 is then actuated in the position shown in FIG. 2. If switching element S1 is connected to the supply voltage (12 V), then so-called 100% information is transmitted here to the vehicle. Vehicle EV is hereby signaled that a connection exists to charging module LM; however no current is available or is being provided.

Figure 3:
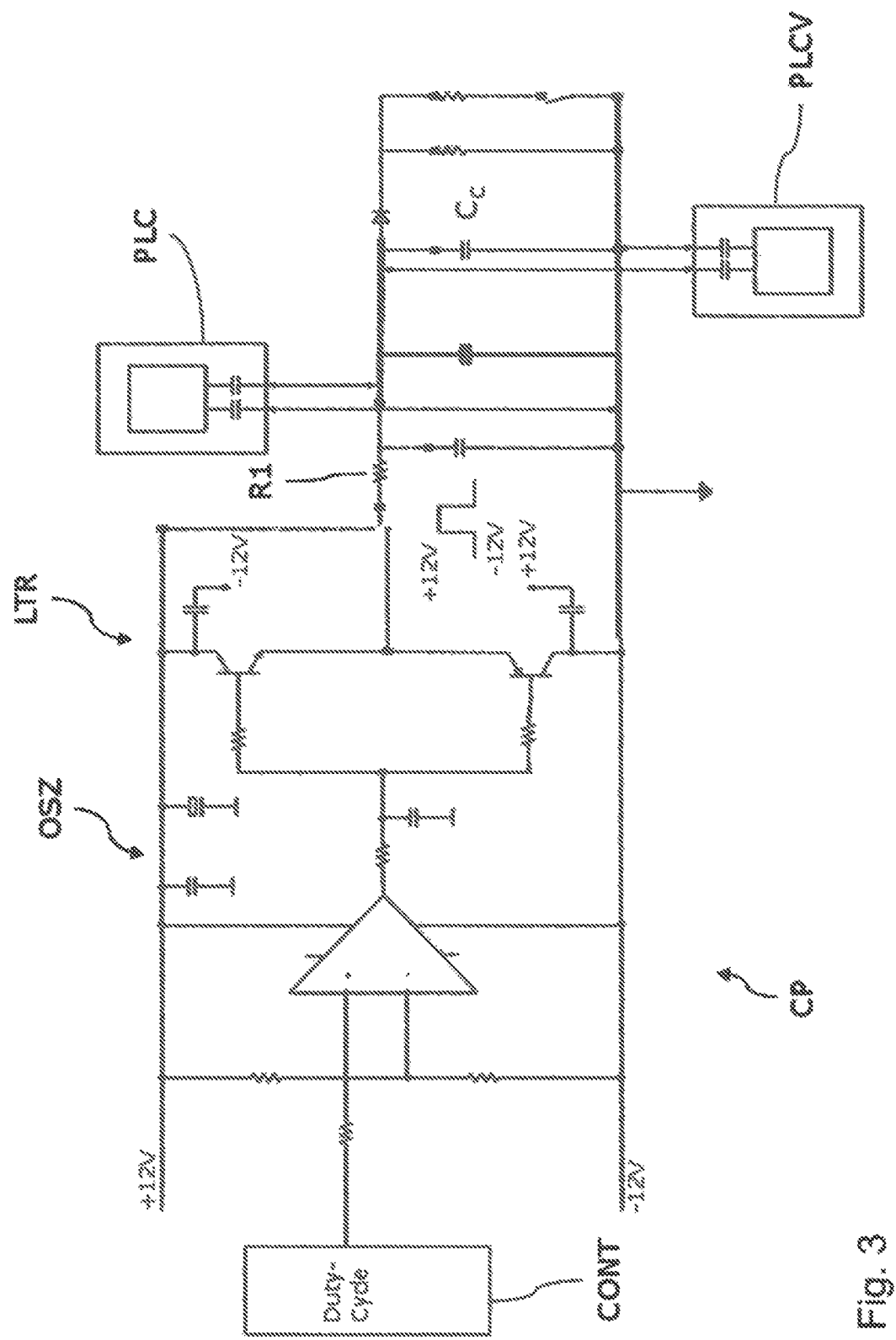
FIG. 3 is an expanded electrical equivalent circuit diagram of the basic circuit depicted in FIG. 2.

FIG. 3 depicts an expanded equivalent circuit diagram of the arrangement from FIG. 2. In doing so, particularly the execution of a power driver of oscillator OSZ is illustrated in further detail. Power driver LTR includes an operational amplifier actuated by controller CONT and that is interconnected with the push-pull amplifier. On the output side, the latter is connected to switching element S1 as can be better seen in FIG. 2. The remaining wiring corresponds to the wiring described in association with FIG. 2.

Figure 4:
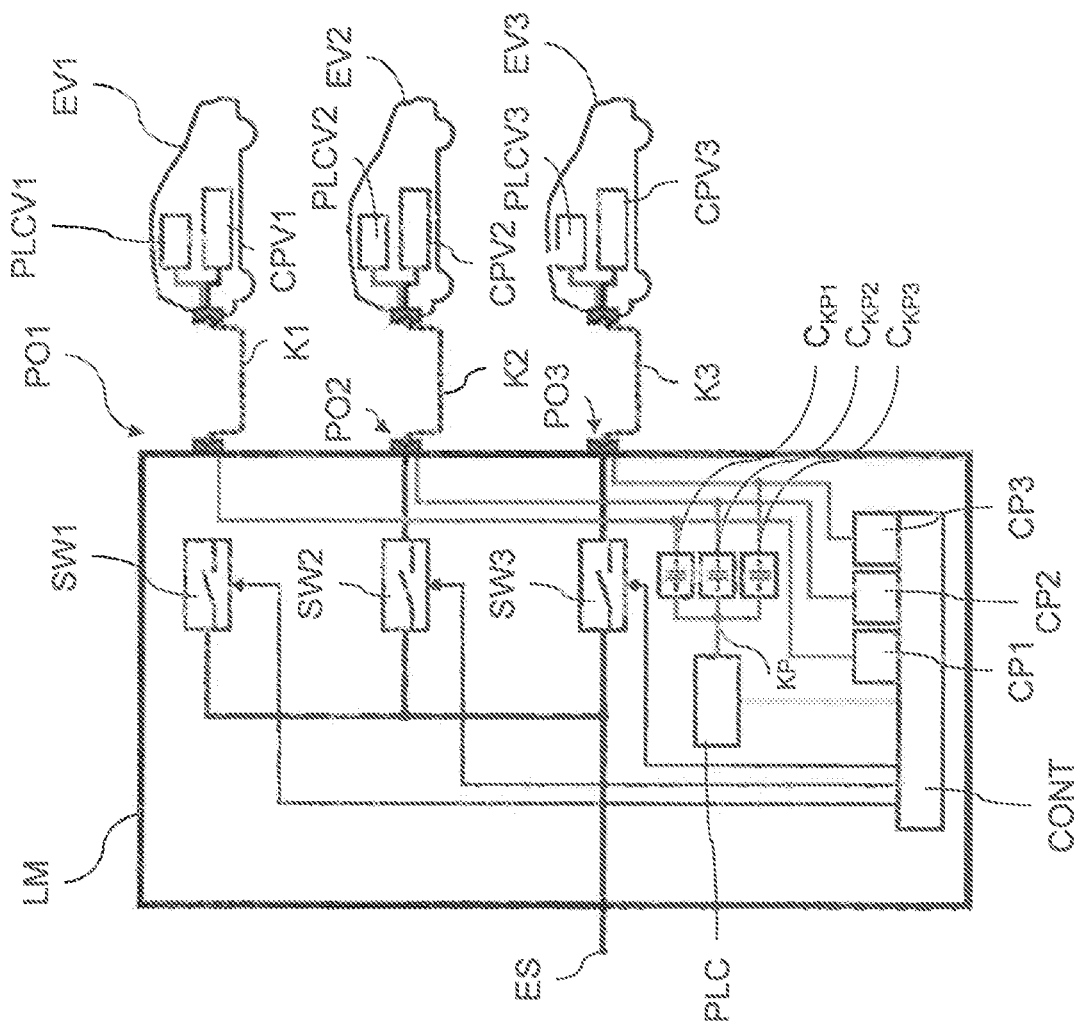
FIG. 4 is a schematic illustration of a charging apparatus at which, for example, three electrically operated vehicles can be charged simultaneously.

FIG. 4 depicts an exemplary charging apparatus LM, with which, for example, three vehicles EV1, EV2, EV3 can be charged simultaneously. Each vehicle EV1, EV2, EV3 is connected via cable K1, K2, K3 to an assigned charging connection PO1, PO2, PO3. Each of the charging connections PO1, PO2, PO3 is assigned a respective first communication device CP1, CP2, CP3. A second communication device PLC is connected via coupling capacitors $C_{KP1}$, $C_{KP2}$, $C_{KP3}$ to the respective communication ports of charging connections PO1, PO2, PO3. Coupling capacitors $C_{KP1}$, $C_{KP2}$, $C_{KP3}$ are connected via coupling point KP to second communication device PLC. As already explained, first communication devices CP1, CP2, CP3 as well as second communication device PLC are controlled by controller CONT.

Each of the charging connections PO1, PO2, PO3 can be connected to an energy network, via a charging-switching element SW1, SW2, SW3 controlled by controller CONT for charging the energy storage unit of vehicle EV1, EV2, EV3. The energy network is hereby connected to line ES going to the non-depicted energy source.

The problem with the arrangement shown in FIG. 4 is that for a communication, e.g., of the first communication device CP2 with the corresponding first communication device CPV2 based on coupling capacitors $C_{KP1}$, $C_{KP2}$, $C_{KP3}$, the corresponding signals can also be received by the other first communication devices CP1, CP3 and the second communication device PLC. Malfunctions may therefor occur.

Figure 5:
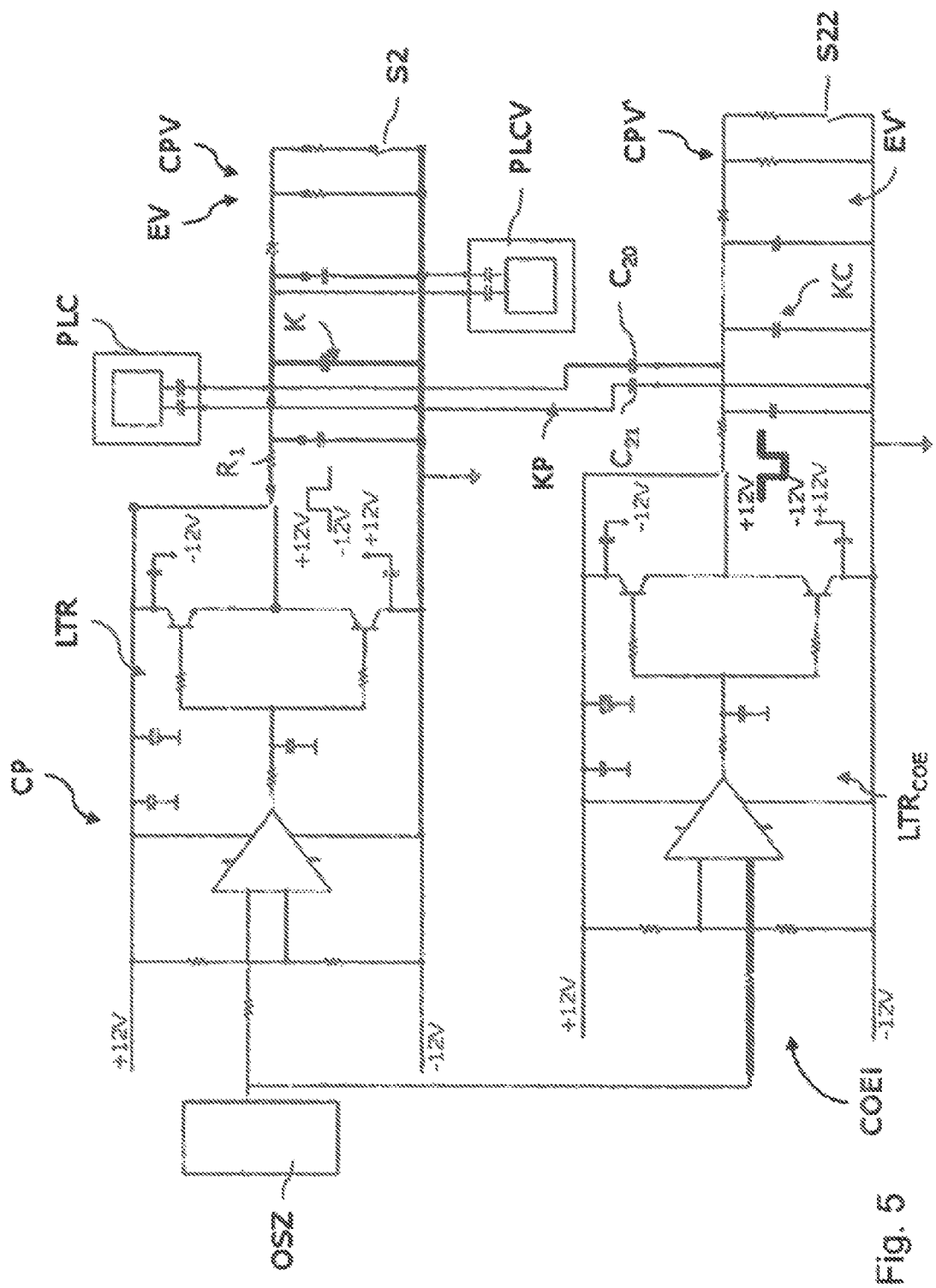
FIG. 5 is an electrical equivalent circuit diagram of a charging apparatus according to an embodiment of the invention for a single charging connection.
Figure 6:
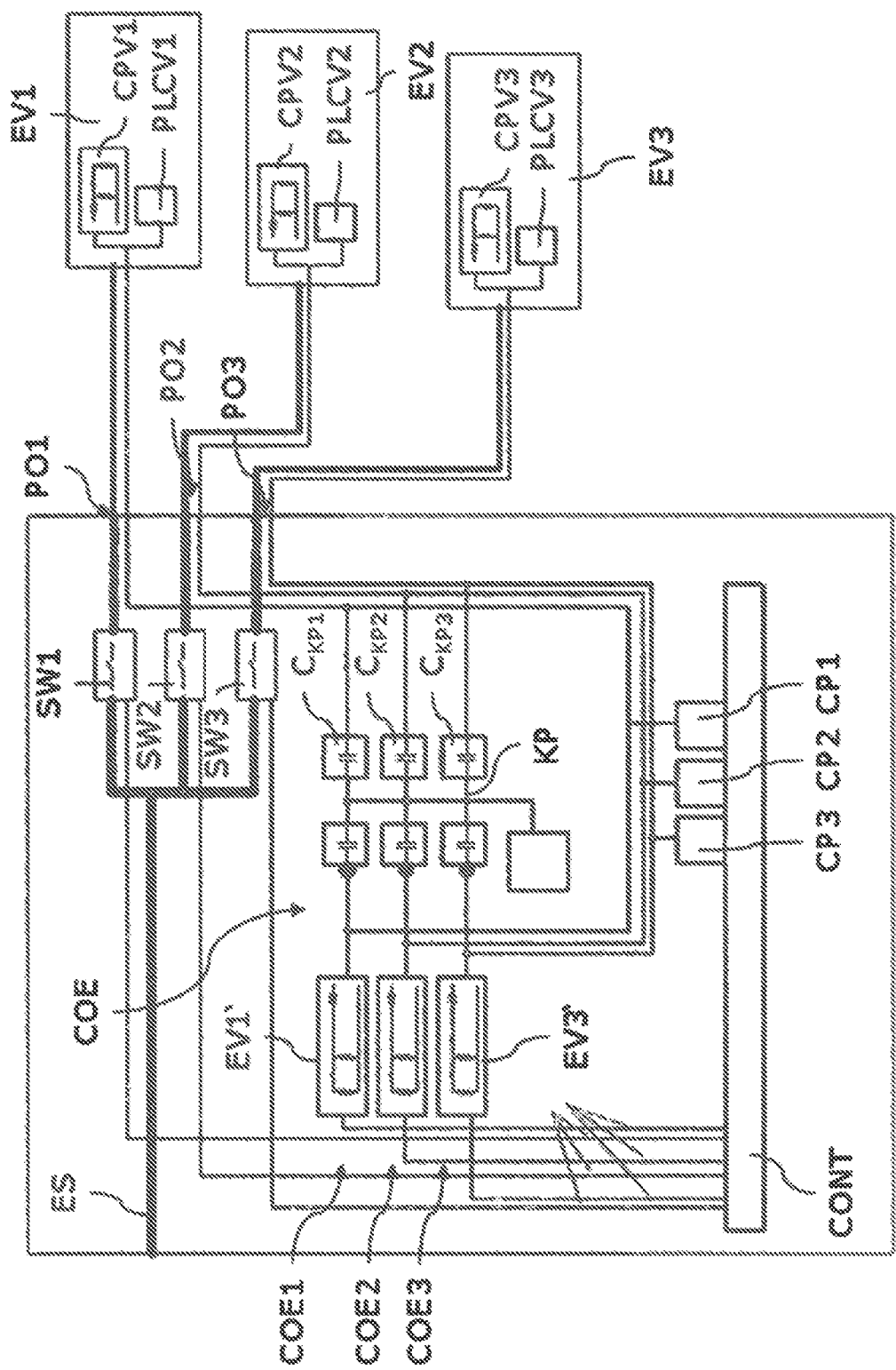
FIG. 6 is a schematic block diagram of a charging apparatus according to an embodiment of the invention at which, for example, three electrically operated vehicles can be charged.

Therefore, the invention provides for a compensation unit COE, whose components, required for one of the first communication devices CP, of a compensation device COEI are illustrated in greater detail in FIG. 5. Communications unit COE is wired in between coupling point KP and first communication devices CP1, CP2, CP3, as can be better seen in the schematic FIG. 6.

The purpose of compensation unit COE consists of generating a counter-phase signal, which is transmitted by a transmitting first communication device, for example CP2, to the assigned communication port POC2 or charging connection PO2, and apply it to coupling point KP. Coupling point KP is hereby kept "neutral" relative to communication devices transmitted by one of the first communication devices. Coupling the signals of the transmitting communication device to other first communication devices and/or the second communication device of charging apparatus LM can thereby be suppressed. The "neutralization" of the signal of the transmitting first communication device occurs by a compensation device COEI assigned to it. In other words, a compensation device COE1, COE2, COE3 is assigned to every first communication device.

The arrangement of a compensation device COEi can be better seen in FIG. 5. FIG. 5 depicts a first communication device CP, a second communication device PLC, the assigned corresponding first and second communication devices CPV, PLCV of vehicle EV, cable K as well as compensation device COEi assigned to the first communication device CP.

Compensation device COEi thereby completely replicates the circuit topology of the first communication device CP, wherein only the operational amplifier of compensation device COEi is connected in a twisted manner to oscillator OSZ or a voltage splitter of the power driver. To keep coupling point KP neutral, not only are power drivers $LTR_{COE}$ of compensation device COEi responsible for the phase shift, but so are switching elements, which replicate the real load by cable K and evaluation circuit PV, PLCV of vehicle EV by concentrated, discrete elements. At the outputs of compensation device COEi, a cable capacity KC and the electrical equivalent circuit diagram of a "virtual" vehicle EV' are therefore depicted. The coupling of compensation device COEi takes place via coupling capacitors $C_{20}$ and $C_{21}$.

To correctly replicate the behavior of vehicle EV when communicating with first communication device CP, the switch position of switching element S2 of vehicle EV is selectively detected, whereby the voltage at resistance R1 is recorded and used as a control signal for switching element S22 of virtual vehicle EV'. The voltage of resistor R1 of the first communication device can, for example, be recorded via a comparator. Corresponding to the level at the output, the position of switching element S22 can be controlled, which corresponds to the switch position of switching element S2 of the actual vehicle EV. Likewise, controlling switching element S22 of virtual vehicle EV' can take place via the controller not depicted in FIG. 5. Oscillator OSZ may be made part of the controller CONT.

Circuit arrangement COEi depicted in FIG. 5 is provided in this form for each of the first communication devices CP1, CP2, CP3. The circuit complexity necessary for this is low, since only one power driver corresponding to the first communication device as well as few switching elements must be provided to replicate cable KC and virtual vehicle EV'. As a result, regardless of the pulse width modulated signal generated in the first communication device CP, coupling point KP can be kept neutral relative to these signals. Feedback or interference on the other first communication device or the second communication device thus no longer exists.

As a result, one is able to provide charging apparatuses, which offer the possibility of various communication forms at a communication port without negatively influencing each other.

LIST OF REFERENCE SIGNS

LM Charging apparatus
PO Charging connection
PO1 Charging connection
PO2 Charging connection
PO3 Charging connection
POC Communication port
POC1 Communication port
POC2 Communication port
POC3 Communication port
LO Power connection
EV Vehicle
EV1 Vehicle
EV2 Vehicle
EV3 Vehicle
EV' Virtual vehicle
EV1' Virtual vehicle
EV2' Virtual vehicle
EV3' Virtual vehicle
CP First communication device
CP1 First communication device
CP2 First communication device
CP3 First communication device
CPV Corresponding first communication device of vehicle EV
CPV1 Corresponding first communication device of vehicle EV1
CPV2 Corresponding first communication device of vehicle EV2
CPV3 Corresponding first communication device of vehicle EV3
PLC Second communication device
PLCV Corresponding second communication device of vehicle EV
PLCV1 Corresponding second communication device of vehicle EV1
PLCV2 Corresponding second communication device of vehicle EV2
PLCV3 Corresponding second communication device of vehicle EV3
COE Compensation unit
COEi Compensation device
COE1 Compensation device
COE2 Compensation device
COE3 Compensation device
KP Coupling point
$C_{KP1}$ Capacitor
$C_{KP2}$ Capacitor
$C_{KP3}$ Capacitor
K Cable
K Cable capacity of compensation unit
CONT Controller/controller
ES Line to energy source
SW Charging-switching element
SW1 Charging-switching element
SW2 Charging-switching element
SW3 Charging-switching element
S2 Switching element
S22 Switching element of compensation unit
OSZ Oscillator
S1 Switching element
R1 Resistor
C1 Capacitor
C2 Capacitor
D Diode
R2 Resistor
R3 Resistor
S2 Switching element
LTR Power driver
$LTR_{COE}$ Power driver of compensation device
A1 Output
A2 Output
E1 Input
E2 Input
$C_{20}$ Coupling capacitor
$C_{21}$ Coupling capacitor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for charging an energy storage unit of one or more electrically operated vehicles, comprising:
   at least two charging connections, wherein each of the charging connections has a communication port for exchanging data with the vehicle when connected to the charging connection, wherein the communication port of each of the at least two charging connections is coupled to an assigned first communication device, which is configured for communicating with a corresponding first communication device of the vehicle connected to the relevant charging connection based on a pulse width modulated signal transmission;

a second communication device is coupled via a coupling point to the communication ports of all charging connections to communicate with a corresponding second communication device of a vehicle based on digital data transmission;

a compensation unit wired in between the coupling point and each of the first communication devices, the compensation unit generating a counter-phase signal to a signal that is transmitted from any of the first communication devices to a corresponding one of the at least two charging connections and applying the counter-phase signal to the coupling point.

2. The apparatus according to claim 1, wherein the compensation unit comprises at least a first function unit for phase-shifting the signal sent out by the transmitting first communication device in operation.

3. The apparatus according to claim 2, wherein the compensation unit comprises at least a second function unit, which replicates an electrical behavior of the corresponding first communication device of the vehicle that is connected to the charging connection, whose assigned first communication device generates the signal.

4. The apparatus according to claim 1, wherein the compensation unit comprises at least a second function unit, which replicates an electrical behavior of the corresponding first communication device of the vehicle that is connected to the charging connection, whose assigned first communication device generates the signal.

5. The apparatus according to claim 3, wherein a switching element of the second function unit is actuated such that its switching state corresponds to the switching state of a corresponding switching element of the corresponding first communication device.

6. The apparatus according to claim 4, wherein a switching element of the second function unit is actuated such that its switching state corresponds to the switching state of a corresponding switching element of the corresponding first communication device.

7. The apparatus according to claim 5, wherein the switching element of the second function unit is controllable by a controller, which serves to control a selector switch of the charging connection and/or the first communication device.

8. The apparatus according to claim 6, wherein the switching element of the second function unit is controllable by a controller, which serves to control a selector switch of the charging connection and/or the first communication device.

9. The apparatus according to claim 5, wherein the switching element of the second function unit is controllable depending on a signal level detected in the transmitting communication device.

10. The apparatus according to claim 6, wherein the switching element of the second function unit is controllable depending on a signal level detected in the transmitting communication device.

11. The apparatus according to claim 9, wherein the second function unit is configured to detect the signal level of a power driver which is constructed as a push-pull amplifier of the first communication device.

12. The apparatus according to claim 10, wherein the second function unit is configured to detect the signal level of a power driver which is constructed as a push-pull amplifier of the first communication device.

13. The apparatus according to claim 3, wherein the compensation unit comprises at least a third function unit configured to replicate the electrical behavior of a line, which connects the vehicle to the charging connection during a charging process.

14. The apparatus according to claim 13, wherein the first, second and/or the third function unit is connected to each of the first communication devices.

15. The apparatus according to claim 13, wherein the compensation unit comprises a plurality of number of compensation devices corresponding to the number of charging connections, wherein each of the compensation devices comprises the first, the second, and the third function units.

* * * * *